(No Model.)
A. LUGER.
JAR.
No. 266,375. Patented Oct. 24, 1882.
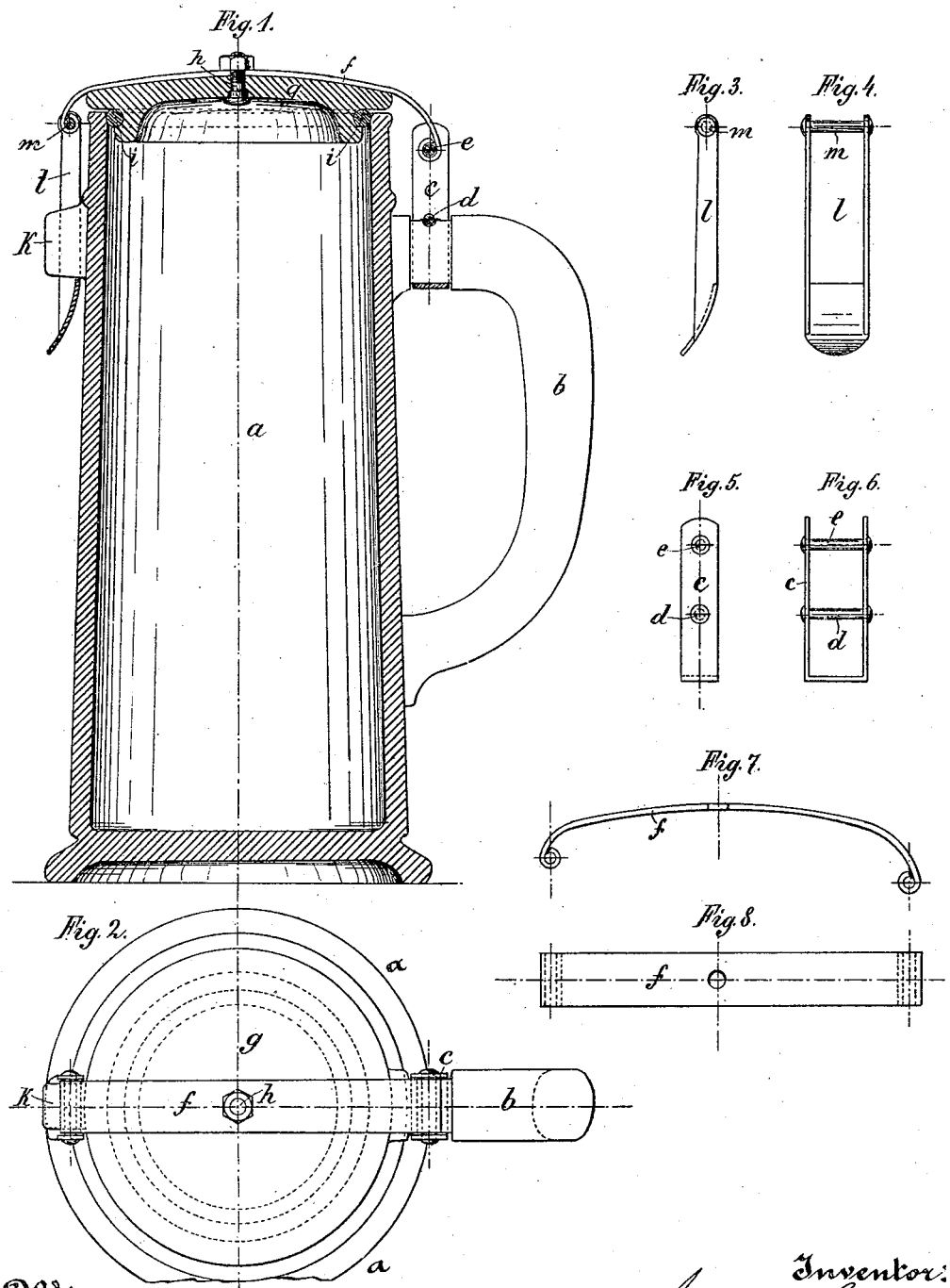
Witnesses:
Jos. H. Rosenbaum
H. Rassbach
Inventor:
Anton Luger
by Paul Goepel
Attorney

UNITED STATES PATENT OFFICE.

ANTON LUGER, OF VIENNA, AUSTRIA-HUNGARY.

JAR.

SPECIFICATION forming part of Letters Patent No. 266,375, dated October 24, 1882.

Application filed August 15, 1882. (No model.)

*To all whom it may concern:*

Be it known that I, ANTON LUGER, of Vienna, Austria-Hungary, have invented certain new and useful Improvements in Jars, of which the following is a specification.

The object of my invention is to produce a jar or vessel for shipping alimentary substances or liquids, which jar may at the same time by its shape or form be adapted for use as a drinking-vessel.

The invention consists of a jar having a cover with a packing ring or gasket, a transverse strap secured to the cover, and links or other means by which the cover or lid is secured to projections of the jar.

Heretofore beer, wines, and other alimentary liquids or substances have been filled and shipped in bottles or jars provided with devices for closing them hermetically, in order to preserve their contents; but the shape of these bottles and the arrangement of their sealing devices have not specially adapted them for use as drinking-vessels, except in an awkward and unpleasant manner. This inconvenience is overcome by the arrangement shown in my improved jar, which is illustrated in the accompanying drawings, in which—

Figure 1 represents a vertical central section of my improved jar or vessel. Fig. 2 shows a plan of the same, and Figs. 3 to 8 show details of the device for locking the cover to the jar.

Similar letters of reference indicate corresponding parts.

As will be seen from Fig. 1 of the drawings, I have chosen a vessel in the shape of a common beer-glass to illustrate my invention, which form, however, is not essential, as evidently a jar or vessel of any convenient shape, size, or material may be employed. This vessel $a$ is arranged with a handle or other projection, $b$, at one side, and with a projection or nose, $k$, at the opposite side.

To the handle $b$ is applied a metal band or clasp, $c$, for the reception of which the handle $b$ is preferably grooved at its upper part, as shown in Fig. 1. The clasp $c$, which projects with its free ends upward, is held in place by a pin, screw, or rivet, $d$, which passes through both its shanks or ends close to the upper part of the handle $b$, so as to hold clasp $c$ tightly in its place. To give pin $d$ a better hold, the top of the handle may be provided with a transverse recess for its reception; or it may be passed through a hole of the handle. The ends of clasp $c$ are connected by a transverse pin or screw, $e$, to which is hinged a strap or cross-piece, $f$, that extends diametrically over the cover $g$. The cover $g$ is preferably made of the same material and of nearly the same diameter as the vessel $a$, the strap $f$ being fastened thereto by means of one or more rivets or screws, $h$, and a nut. In the drawings one screw, passing through the center of the cover $g$, is shown. The cover $g$ projects by its rim over the upper edge of the jar $a$, and extends by an annular shoulder into the jar, as shown. This shoulder is provided with a circumferential groove or recess, which serves for the reception of a rubber or other elastic ring or gasket, $i$, which, when the cover is closed, secures the air-tight sealing of the jar $a$. The inner top edge of the jar $a$ is preferably slightly tapered, so as to serve as a guide for the packing ring or gasket $i$, and secure at the same time the tight and reliable closing of the vessel. A latch or link, $l$, is hinged at $m$ to the opposite end of strap or cross-piece, $f$, and adapted to swing down and engage the nose $k$ at the opposite side of the jar when the cover is pressed down into the mouth of the vessel, whereby the latter is firmly retained in locked position, so as to close the jar hermetically.

When the cover is opened it swings entirely out of the way and leaves the mouth of the jar free for drinking purposes.

Having thus described my invention, I claim as new and desire to secure by Letters Patent—

1. The combination of a jar or vessel, $a$, having a projection or handle, $b$, at one side and a projection or nose, $k$, at the other side, with a lid or cover, $g$, having an elastic packing ring or gasket, $i$, a strap or cross-piece, $f$, attached to the cover, and means for connecting the strap $f$, respectively, with the handle $b$ and nose $k$ of the jar, substantially as set forth.

2. The combination of a jar or vessel, $a$, having a handle, $b$, at one side and a nose or projection, $k$, at the other side, a lid or cover, $g$, having an elastic packing ring or gasket, $i$, a diametrical strap or cross-piece, $f$, attached to the cover $g$, a clasp, $c$, secured to the handle $b$, and by a hinge-connection to strap $f$, and a hinged latch or link, $l$, locking over the nose $k$, substantially as specified.

In testimony that I claim the foregoing as my invention I have signed my name in presence of two subscribing witnesses.

ANTON LUGER.

Witnesses:
ROBT. B. JENTZSCH,
WILLIAM HÜNING.